United States Patent [19]

Krolla et al.

[11] Patent Number: 4,704,371

[45] Date of Patent: Nov. 3, 1987

[54] INFRARED-TRANSPARENT CHALCOGENIDE GLASS

[75] Inventors: Hans-Georg Krolla, Mainz; Magdalena Winkler-Trudewig, Mainz-Finthen; Werner Schumann, Mainz-Mombach, all of Fed. Rep. of Germany

[73] Assignee: Schott Glaswerke, Mainz, Fed. Rep. of Germany

[21] Appl. No.: 911,838

[22] Filed: Sep. 26, 1986

[30] Foreign Application Priority Data

Sep. 26, 1985 [DE] Fed. Rep. of Germany ....... 3534275

[51] Int. Cl.$^4$ ................................................. C03C 3/32
[52] U.S. Cl. ..................................................... 501/40
[58] Field of Search ................................. 501/40, 904

[56] References Cited

U.S. PATENT DOCUMENTS

| | | | |
|---|---|---|---|
| 3,348,045 | 10/1967 | Brau et al. | 501/40 |
| 3,511,672 | 5/1970 | Hilton | 501/40 |
| 3,511,673 | 5/1970 | Hilton | 501/40 |
| 3,771,073 | 11/1973 | Krause et al. | 501/40 |
| 3,820,968 | 6/1974 | Haisty | 501/40 |
| 4,612,294 | 9/1986 | Katsuyama et al. | 501/40 |

Primary Examiner—Mark L. Bell
Attorney, Agent, or Firm—Millen & White

[57] ABSTRACT

Infrared-transparent bi- or multicomponent chalcogenide glasses based on germanium and selenium are improved by doping with 0.05 to 1.0 atom % of at least one of the alkaline earth metals calcium or strontium and/or one of their compounds. Optical fibers and optical elements can be made from these glasses.

11 Claims, 2 Drawing Figures

INFRARED-TRANSPARENT CHALCOGENIDE GLASS

BACKGROUND OF THE INVENTION

This invention relates to an infrared-transparent bi- or multicomponent chalcogenide glass based on selenium and germanium, as well as to optical fibers and optical elements made of such glass.

A general discussion of chalcogenide glasses is found in "Glass: Science and Technology", Uhlmann and Kreidl, Vol. 1, *Glass-Forming Systems*, pages 231–299, Academic Press, New York, 1983, with particular reference to germanium selenium glasses being found on pages 251–254.

These glasses are transparent at a wavelength range of between about 0.9 $\mu$m and about 17 $\mu$m for this reason, they are beneficially utilized in the infrared range, for example, for optical fibers for the transmission of $CO_2$ laser light and for infrared detectors.

The conventional chalcogenide glasses, however, exhibit, at a wavelength of 12.8 $\mu$m, an absorption due to contamination with traces of oxygen and resultant Ge-O lattice vibrations. The trailing end of this absorption band extends to the wavelength 10.6 $\mu$m, so that this glass shows relatively high absorption losses in transmitting infrared radiation in the $CO_2$ laser region.

According to DOS No. 1,621,015, the residual oxygen of the melt, introduced by the manufacturing process and by the starting compounds, can be removed by addition of a reducing agent, such as, for example, carbon or aluminum.

DOS No. 3,443,414 discloses a chalcogenide glass for optical fibers in the infrared region wherein this absorption band is likewise suppressed with aluminum, gallium, or indium.

Hilton et al. (*Journal of Non-Crystalline Solids*, 17:319–338 [1975]) mention, besides aluminum, also zirconium and copper. Silver, magnesium, and potassium chloride are described therein as being of low efficacy.

The above-mentioned doping media exhibit, in part, considerable drawbacks in the production of chalcogenide glasses. Carbon displays a relatively poor reactivity with respect to residual oxygen. Moreover, carbon tends to form agglomerates which, being light scattering centers, are disadvantageous especially in laser-optic applications.

Doping with aluminum is permissible only in very small amounts since aluminum has a strongly corrosive effect on the silica glass crucibles. As a consequence of corrosion, Si-O lattice vibrations are observed in the chalcogenide glass, the absorption band of which lies at about 9.5 $\mu$m and thus exerts a deleterious influence on transmission at a wavelength of 10.6 $\mu$m employed for the $CO_2$ laser. Furthermore, the corrosion weakens the strength of the crucible and thus reduces plant safety which is of particular importance when producing chalcogenide glasses. Moreover, due to the strongly corrosive action of aluminum, the useful life of the silica glass crucibles is diminished, thereby resulting in an increase in manufacturing costs.

The maximum aluminum addition of 100 ppm indicated in DOS No. 3,443,414, and the simultaneously required purity of the starting materials of 99.999%, are, in the final analysis, limits resulting from the corrosive property of aluminum.

Copper and zirconium dopants are effective only at relatively high concentration (1 to 2 atom %), whereby the physical and optical characteristics of the glass are materially altered.

SUMMARY OF THE INVENTION

An object of this invention is to provide a glass composition substantially if not completely eliminating the above-discussed disadvantages of the conventional glasses. Another object is to provide glass articles, such as, for example, glass fibers for the transmission of $CO_2$ laser light and for infrared detectors.

Upon further study of the specification and appended claims, further objects and advantages of this invention will become apparent to those skilled in the art.

To attain the objects of this invention, a germanium-selenium infrared-transparent binary or multicomponent glass is provided which is doped with one or more alkaline earth metals, especially calcium or strontium or compounds thereof.

In general, the glass has the following composition on an atom % basis:

| Component | General Range | Preferred Range |
| --- | --- | --- |
| Germanium | 5–50 | 10–35 |
| Selenium | 25–94 | 35–88.7 |
| Alkaline Earth Metal Dopant | 0.05–1.0 | 0.1–0.3 |
| Antimony | 0–28 | 1–20 |
| Other | 0–70 | 0–60 |

A preferred glass contains as the alkaline earth metal dopant either calcium or strontium exclusively.

The multicomponent chalcogenide glasses contain besides the binary of germanium and selenium, one or more of the following other elements: Sb, P, As, Bi, S, Te, Br, I, In, Tl, Ga, Si, Sn, Pb, Ca, Ag, Sr. It has been found surprisingly that the absorption band at 12.8 $\mu$m is narrowed, without the aforementioned drawbacks, by the addition of calcium and/or strontium in particular, as a metal, halide, hydride, nitride, telluride, arsenide, antimonide, or in a compound having a glass component of the bi- or multicomponent chalcogenide glass system, e.g., phosphide, silicide, selenide.

According to this invention, it is also possible to utilize mixtures of the individual doping media indicated herein.

It is advantageous to employ compounds which are not hygroscopic or absorb oxygen as early as during the mixture preparation.

This means that for the halides, complex halide compounds are preferred, for example $CaSbI_5$.

Owing to the fact that calcium and strontium exhibit little or no corrosive activity on the silica glass crucibles, it is possible to begin with starting materials having a higher level of impurities; it is merely necessary to adapt the doping level in correspondence with the oxygen content. By a higher level of impurities is meant, for example, an oxygen level of the raw materials of about 100 ppm which could be gettered by 1 at-% Ca or Sr.

Accordingly, by permitting such a high level of impurities in the starting materials, the costs thereof are less and a reduction in manufacturing cost can be achieved.

Beryllium shows an effect similar to that of calcium and strontium; however, it is highly toxic.

BRIEF DESCRIPTION OF THE DRAWINGS

Various other objects, features and attendant advantages of the present invention will be more fully appreciated as the same becomes better understood when considered in connection with the accompanying drawings, wherein:

The transmission characteristics of glasses of the invention are illustrated in FIGS. 1 and 2, the glasses being doped with Ca and Sr, respectively.

DETAILED DESCRIPTION OF DRAWINGS

In each Figure, the transmission curves are plotted for a doped glass and an undoped glass of identical specimen thickness, in a wavelength range of 0.8 μm to 25 μm. The compositions of these glasses are described in Examples I and II.

It is seen from the Figures that the dopants provide a flat transmission curve with no deleterious decrease in the pertinent wavelength range.

Without further elaboration, it is believed that one skilled in the art can, using the preceding description, utilize the present invention to its fullest extent. The following preferred specific embodiments are, therefore, to be construed as a merely illustrative, and not limitative of the remainder of the disclosure in any way whatsoever.

In the preceding text and the following examples, all temperatures are set forth uncorrected in degrees Celsius and all parts and percentages are by weight; unless otherwise indicated.

EXAMPLE I

Under inert conditions, weighed quantities of 367.50 g of germanium, 266.55 g of antimony, 864.15 g of selenium, and 13.20 g of calcium iodide are introduced into a clean and dry silica glass crucible.

The purity of the raw materials is 99.99%.

After evacuation of the crucible to $\leq 10^{-4}$ mbar and heating up to about 100° C. within about 5 hours, the crucible is sealed gastight. Subsequently, the temperature is raised within 48 hours to 1000° C. At this temperature, the melt is homogenized for 24 hours. Then the temperature is allowed to drop to 300° C. within about 3 hours; in this step, for preventing crystallization, it is advantageous to pass through the temperature range from 550° C. to 300° C. as quickly as possible.

Figure 1:
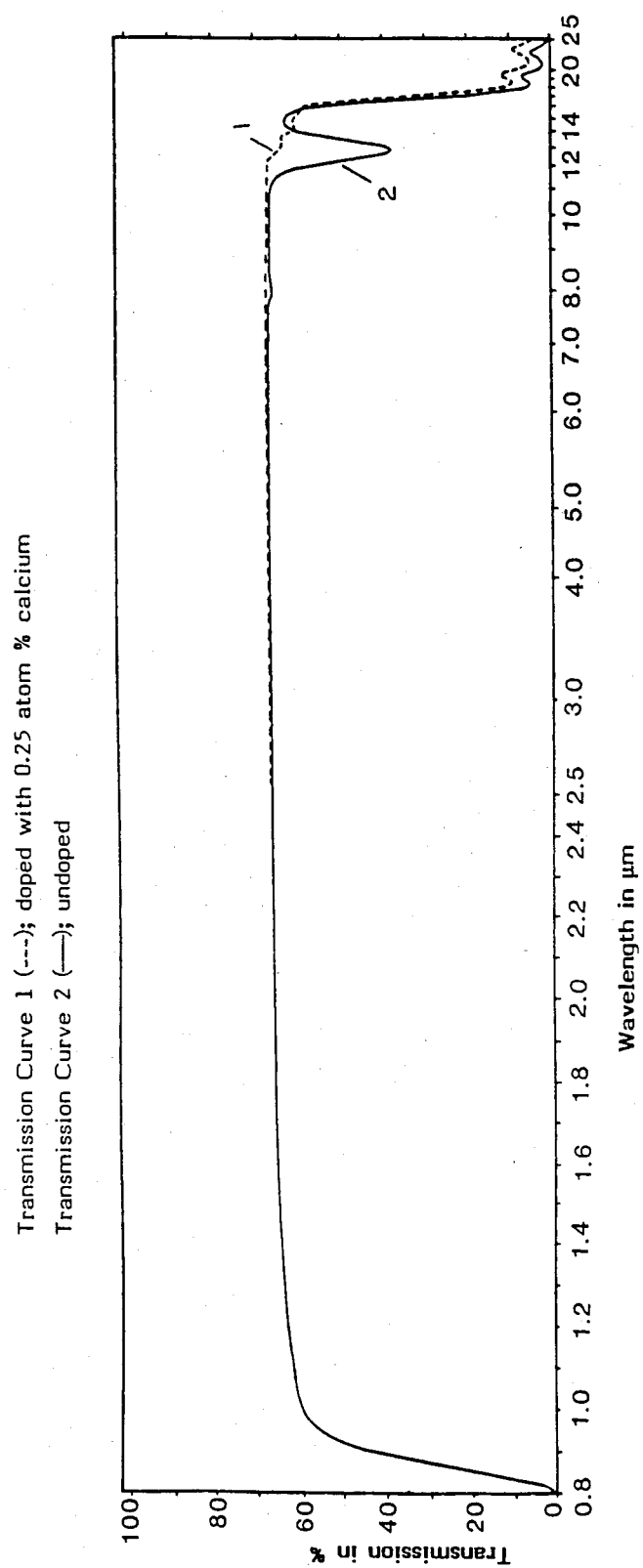

The glass is cooled starting with 300° C. to room temperature at a cooling rage of 10° C. per hour. The transmission curve of the glass is illustrated in FIG. 1.

EXAMPLE II 366.90 g of germanium, 266.10 g of antimony, 862.95 g of selenium, and 15.78 g of strontium iodide are weighed in and melted in correspondence with the mode of operation described in Example I.

Figure 2:
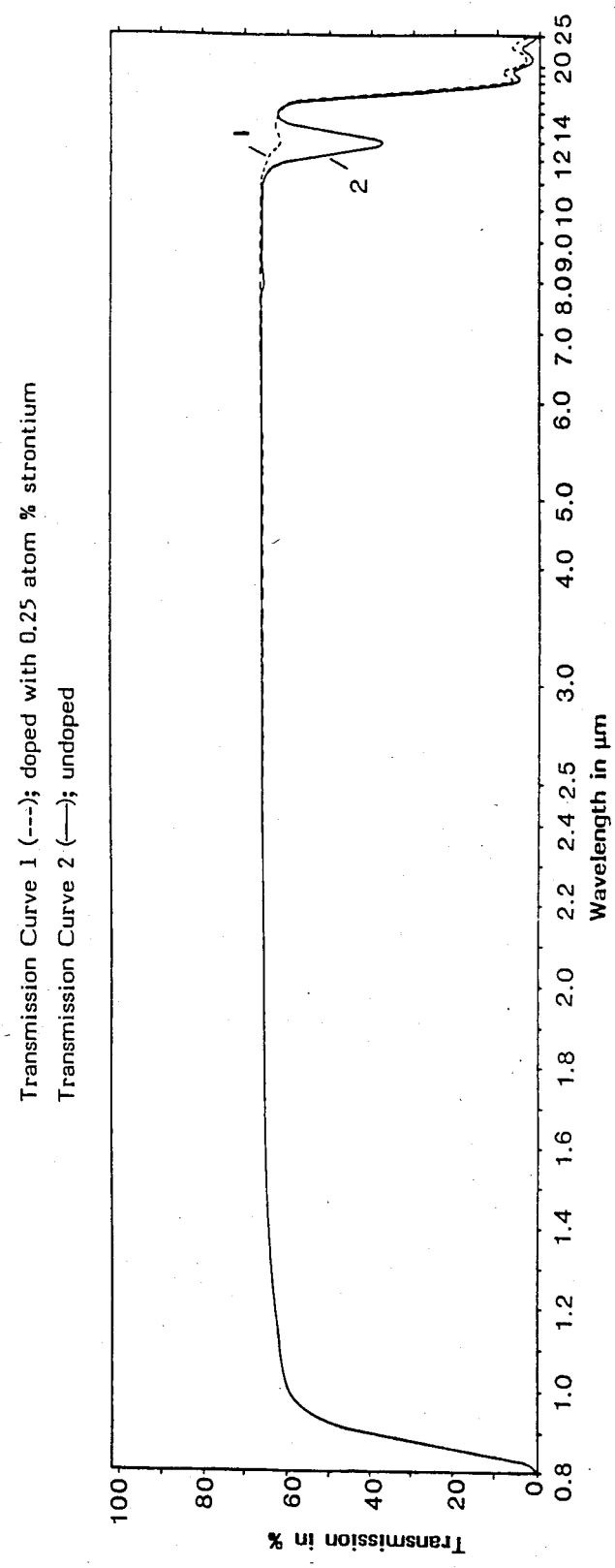

The transmission curve of the glass is shown in FIG. 2.

Optical fiber, infrared detectors, and optical elements can be produced in a conventional manner by using the glasses of this invention.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a dopant-containing infrared-transparent chalcogenide glass comprising germanium and selenium, the improvement wherein said chalcogenide glass comprises 5-50 atom % germanium, 25-94 atom % selenium, and dopant, wherein said dopant comprises 0.05 to 1.0 atom % of at least one of the alkaline earth metals selected from the group consisting of calcium, strontium and a compound thereof.

2. A glass according to claim 1, wherein the dopant is exclusively calcium.

3. A glass according to claim 1, wherein the dopant is exclusively strontium.

4. A glass according to claim 1, wherein the glass was produced by employing the alkaline earth metal in the form of a halide, hydride, nitride, telluride, arsenide, antimonide, or in the form of a compound with a glass component of this bi- or multi-component chalcogenide glass system, or in the form of a mixture thereof.

5. A glass according to claim 1, further comprising antimony present in a concentration of not more than 28 atom %.

6. A glass according to claim 1 wherein said glass comprises 10-35 atom % germanium, 35-88.7 atom % selenium, and 0.1-0.3 atom % dopant.

7. A glass according to claim 6, further comprising antimony present in a concentration of 1-20 atom %.

8. A glass according to claim 1 wherein said glass comprises 0.1-0.3% dopant.

9. A glass according to claim 1, wherein said dopant is $CaSbI_5$.

10. A glass according to claim 1, wherein said dopant is calcium iodide.

11. A glass according to claim 1, wherein said dopant is strontium iodide.

* * * * *